(12) United States Patent
Oh et al.

(10) Patent No.: US 9,263,080 B2
(45) Date of Patent: Feb. 16, 2016

(54) METHOD OF ALIGNING LIGHT SOURCES IN AN OPTICAL PICKUP DEVICE, AND OPTICAL PICKUP AND OPTICAL DISC DRIVE EMPLOYING THE METHOD

(71) Applicant: Toshiba Samsung Storage Technology Korea Corporation, Suwon-si (KR)

(72) Inventors: Jung-bae Oh, Suwon-si (KR); Il-boon Ko, Suwon-si (KR); Ki-bok Kim, Suwon-si (KR); Hyun-wook Nam, Suwon-si (KR); Eun-goo Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 171 days.

(21) Appl. No.: 14/183,934

(22) Filed: Feb. 19, 2014

(65) Prior Publication Data

US 2014/0233367 A1     Aug. 21, 2014

(30) Foreign Application Priority Data

Feb. 20, 2013   (KR) ........................ 10-2013-0018241

(51) Int. Cl.
  *G11B 7/1353*  (2012.01)
  *G11B 7/1275*  (2012.01)
  *G11B 7/22*    (2006.01)

(52) U.S. Cl.
  CPC .............. *G11B 7/1275* (2013.01); *G11B 7/22* (2013.01); *Y10T 29/49021* (2015.01)

(58) Field of Classification Search
  None
  See application file for complete search history.

(56) References Cited

U.S. PATENT DOCUMENTS

| 5,287,375 A | 2/1994 | Fujimoto | |
| 2002/0105876 A1* | 8/2002 | Byun | G11B 19/26 369/53.15 |
| 2006/0250918 A1* | 11/2006 | Hsu | G11B 7/004 369/59.11 |
| 2009/0196138 A1* | 8/2009 | Kaji | G11B 7/126 369/59.11 |

FOREIGN PATENT DOCUMENTS

| JP | 11-144287 A | | 5/1999 |
| JP | 2000076689 A | * | 3/2000 |
| JP | 2011-108296 A | | 6/2011 |
| JP | 2011159348 A | * | 8/2011 |
| KR | 10-0350983 B1 | | 8/2001 |

OTHER PUBLICATIONS

English machine translation of JP 2000-076689 A (Kamiyama, Tetsuo; Optical Pickup Device; published Mar. 2000).*
English machine translation of JP 2011-159348 A (Fujita et al.; Laser Unit, Optical Pickup Device Having the Same, Optical Information Equipment and Laser Unit Adjustment Method; published Aug. 2011).*

* cited by examiner

*Primary Examiner* — Wayne Young
*Assistant Examiner* — Mark Fischer
(74) *Attorney, Agent, or Firm* — NSIP Law

(57) ABSTRACT

Provided is an optical pickup device and a method of aligning a twin-light source in an optical disc drive. The method operates two light emitting chips in the light source simultaneously to cause two laser beams to be transmitted through a grating element at the same time. Location errors and rotation errors of the two light emitting chips with respect to the grating element may be corrected while monitoring the laser beams transmitted through the grating element.

16 Claims, 8 Drawing Sheets

METHOD OF ALIGNING LIGHT SOURCES IN AN OPTICAL PICKUP DEVICE, AND OPTICAL PICKUP AND OPTICAL DISC DRIVE EMPLOYING THE METHOD

CROSS REFERENCE TO RELATED APPLICATION(S)

This application claims the benefit under 35 USC §119(a) of Korean Patent Application No. 10-2013-0018241, filed on Feb. 20, 2013, in the Korean Intellectual Property Office, the entire disclosure of which is incorporated herein by reference for all purposes.

BACKGROUND

1. Field

The following description relates to an optical pickup device and a method of aligning light sources in an optical disc drive, and more particularly, to a grating element in an optical pickup device having a light source for multiple types of media discs.

2. Description of Related Art

In an optical pickup device, a path of a light beam from a light source and a path of a light beam reflected from a disc often overlap with each other in some section. As well known in the art, the paths overlap with each other within a section from a disc to a beam splitter, and the beam splitter splits the paths into the beam from the light source and the beam from the disc. The beam splitter causes the beam from the light source to proceed toward the disc, and causes the beam reflected from the disc to proceed toward a photodetector.

In a typical optical pickup device, a grating element is used to convert a light beam from the light source into multiple beams such as three beams. The grating element refracts a source beam from the light source to form the three beams. From among the three beams, refracted beams at opposite sides of a center beam are arranged with constant intervals. Here, the center beam is not refracted. In order to read and write to the disc, the three beams should be aligned with respect to a running track on which a laser beam is directed towards.

To align the beams, the light source and the grating element need to be arranged accurately in the optical pickup device. This arrangement is typically performed during a manufacturing processes of the optical pickup device. The arrangement is critical in an optical pickup device corresponding to multi-media, for example, an optical pickup device generating laser beams for multi-media using a single light source. An example of a multi-media light source is a twin light source that generates a laser beam for a compact disc (CD) and generates a laser beam for a digital versatile disc (DVD). The two laser beams are typically generated by separate laser chips provided in one light source.

In an optical pickup device using the twin light source, a grating element and the light source are arranged such that an intermediate location between the DVD chip and the CD chip is matched to an optical path that passes through the optical center of the grating element. When performing the alignment, relative locations and postures of the grating element and the light source are adjusted while monitoring a laser beam emitted toward an objective lens via an imaging device such as a charge-coupled device (CCD). Conventionally, only one light emitting chip, for example, the DVD chip, is aligned. This often results in a misalignment of the CD chip that is offset from the DVD chip. The misalignment denotes that an extension line between the CD chip and the DVD chip is not correctly aligned in a direction of a polarization axis of a grating element. Such a misalignment is an alignment error (hereinafter, a rotation error or a radial error) in a radial direction surrounding an optical center axis of the grating element. The rotation error needs to be corrected during manufacturing the optical pickup device.

However, because the alignment process is performed in a state where an electric current is applied to only one light emitting chip, for example, the DVD chip, only the laser beam for DVD is aligned. Accordingly, the rotation error of the extension line between the DVD chip and the CD chip may not be accurately corrected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided a method of aligning a twin-light source and a grating element in an optical pickup device, the method including generating two laser beams from two light emitting chips of the twin-light source by supplying an electric current to the two light emitting chips, aligning the twin-light source with respect to the grating element while simultaneously monitoring a diffraction status of the two laser beams as they are transmitted through the grating element using an imaging device, and fixing the grating element and the light source to a base of the optical pickup device, in response to the aligning.

The generating may comprise forming, by a collimating lens, the two laser beams as parallel light, and during the aligning the imaging device captures the two laser beams transmitted through the collimating lens.

The twin-light source may comprise a twin light source for a compact disc (CD) and a digital versatile disc (DVD).

The twin-light source may be driven by an electric current supplied from a laser diode driver (LDD).

The aligning may comprise adjusting location errors and rotation errors of the two light emitting chips with respect to an optical center axis of the grating element.

The aligning may comprise matching the optical center axis to one light emitting point of the two light emitting chips, and aligning an extension line connecting light emitting points of the two light emitting chips with respect to a direction of a polarization axis of the grating element.

The method may further comprise coupling the twin-light source and the grating element to the base of the optical pickup device, prior to performing the generating.

In an aspect, there is provided an optical disc drive, including an optical pickup device comprising a twin-light source that has two light emitting chips for generating two laser beams, and a grating element for diffracting the two laser beams as they pass through, and a laser diode drive (LDD) comprising a signal processing unit for processing electric signals emitted from the optical pickup device, and a plurality of output ports for supplying electric currents to the two light emitting chips to control an output of the twin-light source during a simultaneous alignment operation of the two light emitting chips and the grating element.

The twin-light source may comprise a twin light source for a compact disc (CD) and a digital versatile disc (DVD).

The plurality of output ports may comprise two output ports for supplying the electric current to the twin-light source for CD and DVD, and the two output ports output an electric current during the alignment operation for correcting a location and a posture of the twin-light source with respect to the grating element.

The LDD may further comprise a select port which receives a signal from the LDD and which is configured to select one or more of two output ports to which a signal is to be supplied to determine which of the two light emitting chips is to be driven.

The signal applied to the select port may comprises one of a first voltage, a second voltage, and a third voltage which are different voltage levels from each other, and in response to a signal of the first voltage or the third voltage being applied, only one of two output ports is selected, and in response to a signal of the second voltage being applied, both of the two output ports are selected.

In an aspect, there is provided a method of aligning a twin-light source in an optical disc drive, the method including generating two laser beams from two light emitting chips in a twin-light source of an optical pickup of the optical disc drive by supplying an electric current to the two light emitting chips of the twin-light source using a laser diode drive (LDD) provided in the optical disc drive, transmitting the two laser beams through a grating element provided in the optical pickup device, and simultaneously aligning the two light emitting chips of the twin-light source with respect to the grating element while monitoring diffraction states of the two laser beams transmitted through the grating element.

The twin-light source may comprise a light source for a CD and a DVD.

The LDD may comprise two output ports for supplying an electric current to the twin-light source and a select port which receives a signal from the LDD and which is configured to select one or more of the two output ports to determine which of the two light emitting chips is to be driven, and the two output ports output the electric current in a process of correcting a location and a posture of the twin-light source with respect to the grating element.

The signal applied to the select port may comprise one of a first voltage, a second voltage, and a third voltage that are different voltage levels from each other, and in response to a signal of the first voltage or the third voltage being applied, only one of the two output ports is selected, and in response to a signal of the second voltage being applied, both of the two output ports are selected.

Other features and aspects may be apparent from the following detailed description, the drawings, and the claims.

Figure 1:
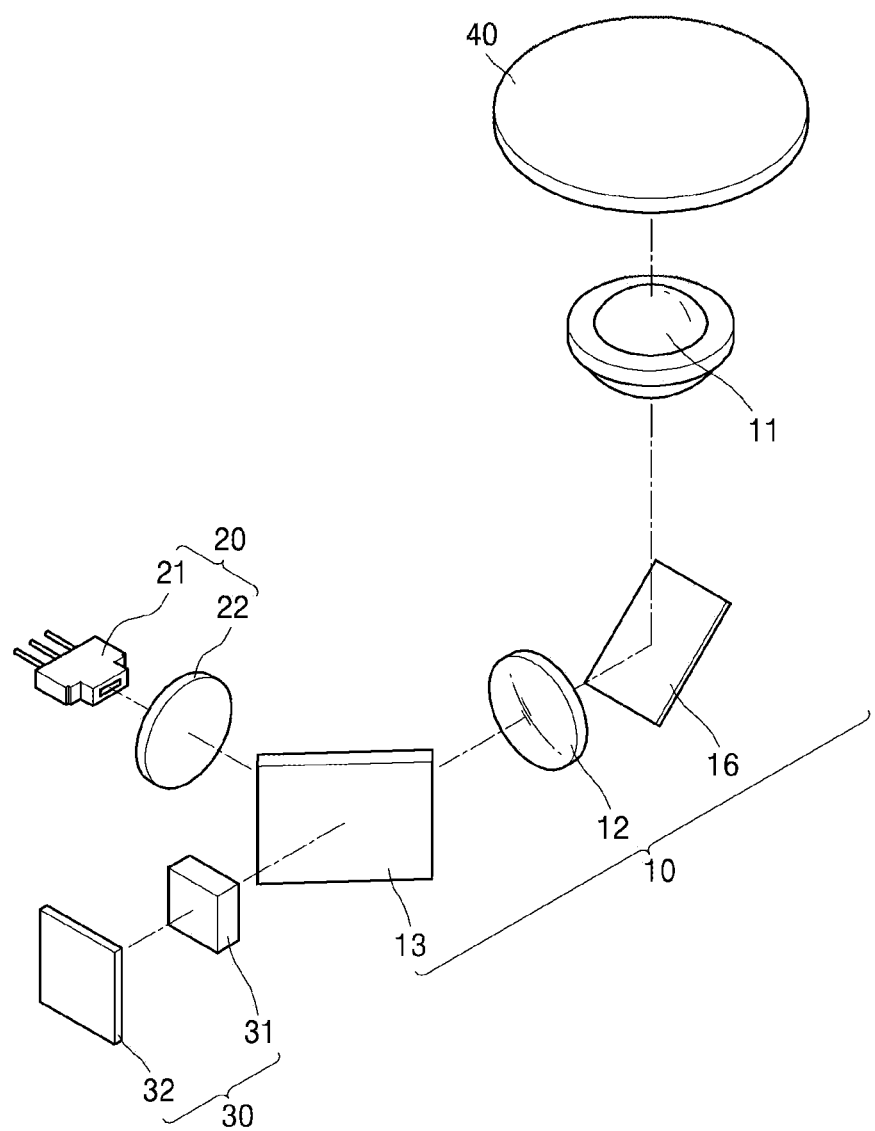
FIG. 1 is a diagram illustrating an example of various components of an optical pickup device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following description relates to a method of aligning a twin light source emitting laser beams of two wavelengths from one light source with respect to a grating element forming three beams. For example, unlike a conventional method of aligning a light source in a state in which only a single light emitting chip is driven, two light emitting chips may be aligned with respect to the grating element by monitoring laser beams emitted from the two light emitting chips in a state in which the two light emitting chips in the twin light source are driven simultaneously.

According to various aspects, the method may be performed in a state in which an optical pickup device is tentatively assembled (or semi-assembled), or may be performed in a state in which an optical disc drive is tentatively assembled before being completed or in component stage before being assembled. For example, an electric current may be supplied to the light source by an exclusive test or measuring apparatus. However, as another example, an optical pickup device and a circuit unit connected to the optical pickup device may be used to perform the alignment of the light source, and they may be combined later. That is, the optical pickup device and the circuit unit may be paired as a set, characteristics of which are matched to each other through the alignment.

Figure 2:
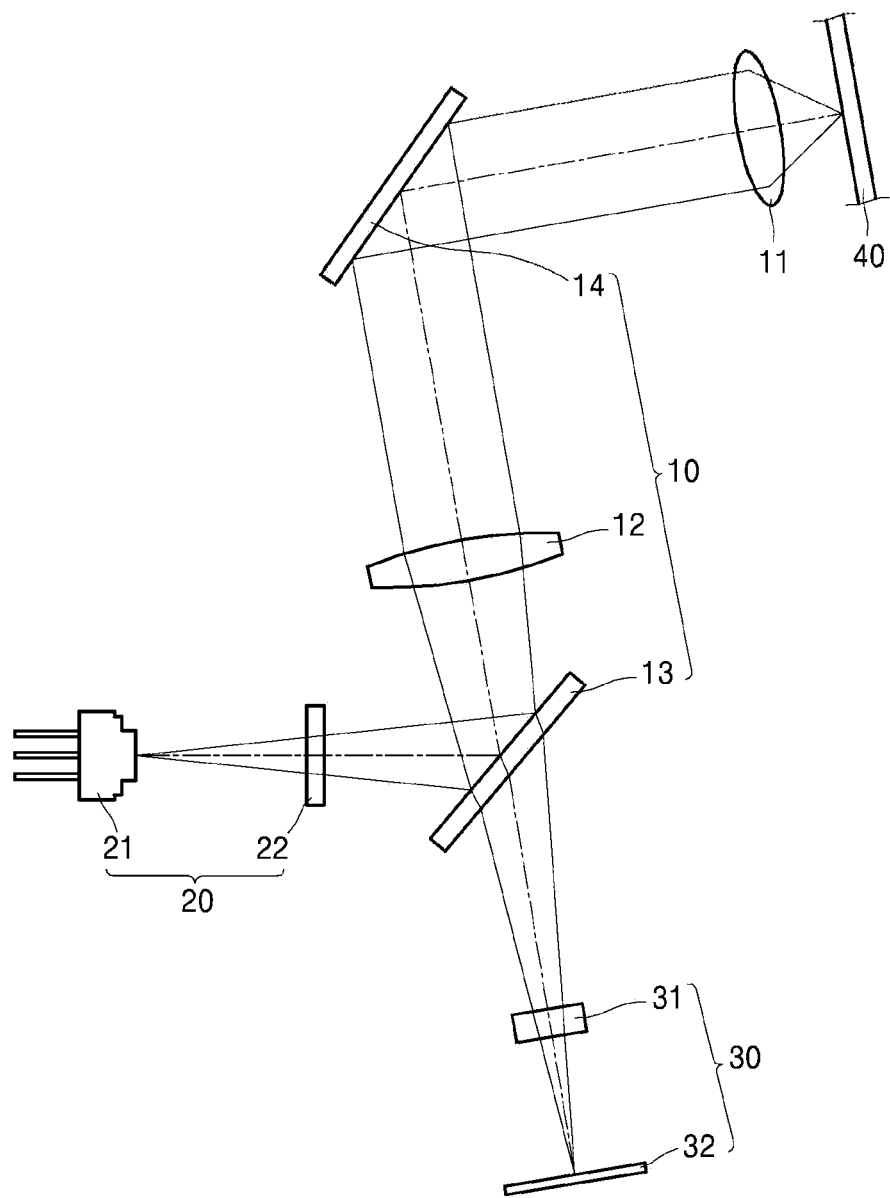
FIG. 2 is a diagram illustrating a side-view of the optical pickup device.

FIG. 1 illustrates an example of an optical pickup device for use with multiple types of media, in which a light source may be aligned, and FIG. 2 illustrates an example of a side view of the optical pickup device.

Referring to FIGS. 1 and 2, the optical pickup device includes a transmission system 10, a light source system 20, and a light receiving system 30. The light source system 20 includes a light source 21 generating a source beam, and a grating element 22 which generates multiple beams, for example, three-beams by refracting the source beam. Here, the source beam may be a laser beam before being modulated by a recording layer of an optical disc 40, and a laser beam emitted from the light source 21 before being incident to the disc via an objective lens 11. In addition, the source beam may include a main beam and source beams on opposing sides of the main beam which are generated by the grating element. Therefore, the source beam and a modulated beam may include the main beam and the two sub-beams. The light source 21 may be a twin light source that generates laser beams of two different wavelengths, for example, a laser beam for a compact disc (CD) and a laser beam for a digital versatile disc (DVD).

The transmission system 10 transmits the source beam emitted from the light source system 20 toward an optical disc 40, and transmits a reflected beam reflected by the optical disc 40 toward the light receiving system 30. In this example, the transmission system 10 includes a beam splitter 13 reflecting the source beam emitted from the light source system 20 toward the optical disc 40 and transmitting a modulated beam or reflected beam from the optical disc 40 toward the light receiving system 30. The transmission system 10 also includes a collimating lens 12 which is used to adjust the source beam to be parallel light, and an objective lens 11 focusing the source beam on a recording surface of the optical disc 40. The transmission system 10 may also include one or more mirrors 16 for changing an optical path.

Figure 3:
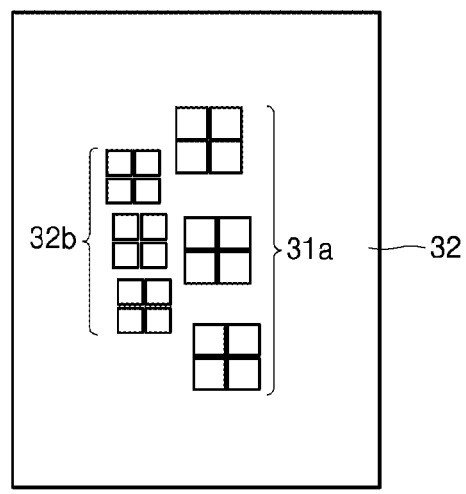
FIG. 3 is a diagram illustrating an example of a light receiving element of an optical pickup device for a compact disc (CD)/digital versatile disc (DVD).

The light receiving system 30 includes a light receiving device 32 and a sensing lens (detecting lens) 31. The sensing lens 31 may focus a modulated beam or a reflected beam that has a three-beam structure and which is reflected from the optical disc 40 with an appropriate size for a light receiving region of the light-receiving device 32. The light receiving device 32, as shown in FIG. 3, has a light receiving region 31a for CD and a light receiving region for DVD 32b, and each of the light receiving regions 31a and 32b has a structure in which four-divided pixel regions are arranged with an appropriate interval to be suitable for the three-beam structure. Accordingly, the source beam generated by the grating element 22 may be displayed on a running track of the optical disc 40, and the modulated beam reflected from the optical disc 40 may form a beam spot of an appropriate size on the corresponding light receiving region 31a or 32b. Referring to FIG. 3, the four-divided pixel regions in each of the light receiving regions 31a and 32b are inclined toward a side. Accordingly, the light source 21 and the grating element 22 may also be inclined in the same direction as that of the four-divided pixel region. However, FIGS. 1 and 2 do not illustrate the inclination for the convenience of description.

In this example, because locations of the grating element 22 and the light source 21 are not appropriately adjusted, it is difficult to perform a tracking and a light detecting operation. According to various aspects, manufacturing processes of the optical pickup device and the optical disc drive may include one or more processes of aligning the light source 21 and the grating element 22. Such processes may be performed in a state in which the optical pickup device is semi-assembled or temporarily assembled, for example, in a case in which an objective lens is not mounted in the optical pickup device or an objective lens actuator including the objective lens is not mounted in the optical pickup device.

Figure 4:
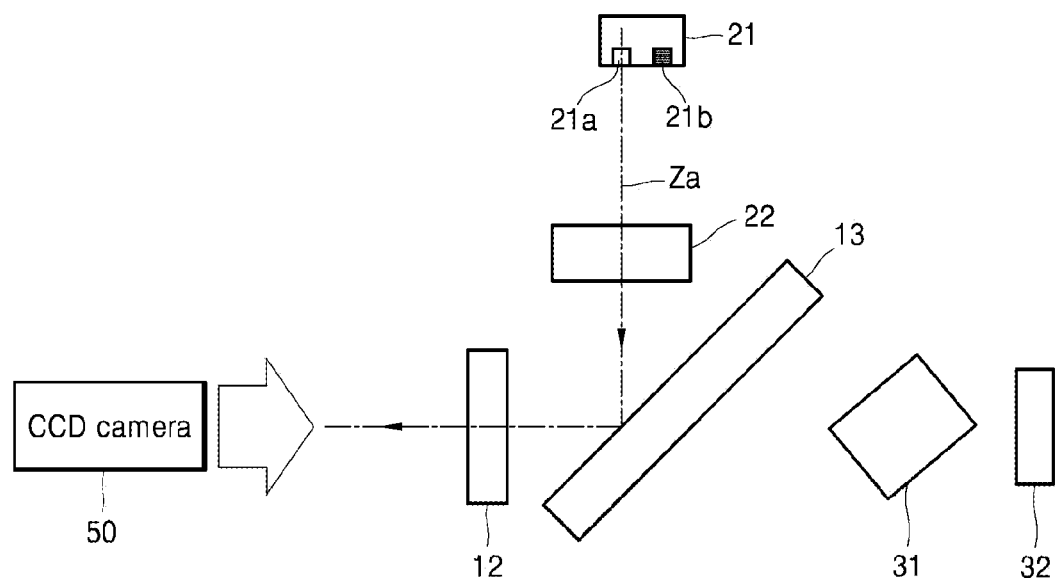
FIG. 4 is a diagram illustrating an example of a method of aligning a light source in an optical pickup device.

FIG. 4 illustrates an example of a method of aligning the light source and the grating element in the optical pickup device of a semi-assembled state. As shown in FIG. 4, in the optical pickup device, an imaging device 50 is disposed at an opposite side of a direction of the source beam emitted from a collimating lens 12 so as to directly capture the source beam emitted from the light source 21 in a reference optical axis Za and reflected from the beam splitter 13 to check a status of the source beam via a monitoring apparatus. According to various aspects, all of light emitting chips in the twin light source 21, for example, a light emitting chip for CD as well as a light emitting chip for DVD may be simultaneously driven. Locations and postures of the grating element and the light source may be checked from the captured image, and a degree of error may be determined to correct the error.

Figure 5A:
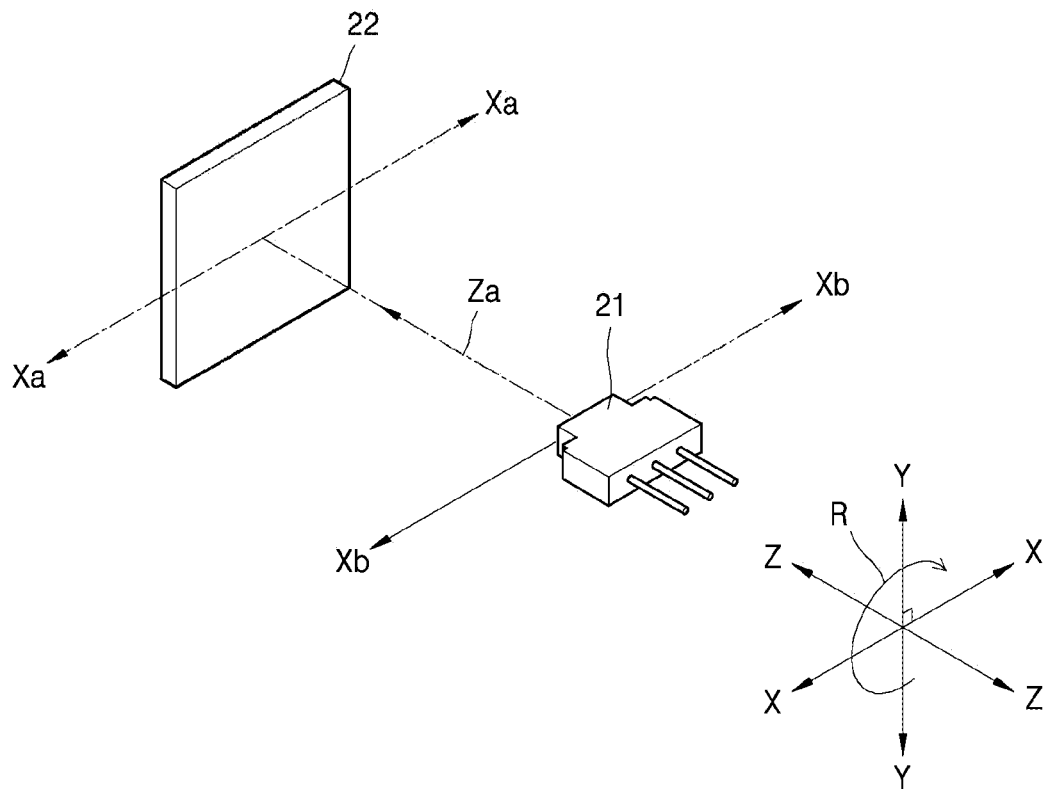
FIG. 5A is a diagram illustrating an example of a direction of aligning a light source with respect to a grating element according to the method of aligning the light source in the optical pickup device.
Figure 5B:
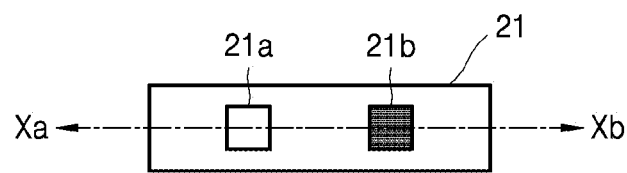
FIG. 5B is a diagram illustrating an example of a front view of a twin light source.

Referring to FIG. 5A, after determining whether a polarization axis Xa-Xa of the grating element 22 is correctly aligned with respect to a track of the optical disc 40 or a light receiving region of the light receiving device, the error may be corrected, and then, an offset amount or a shift amount between a reference optical axis Za through which the source beam emitted from one reference light emitting chip selected in the light source 21, for example, the light emitting chip for the DVD or a light emitting point. At the same time, as shown in FIG. 5B, an inclination may be determined between an extension line or an alignment line (Xb-Xb) connecting light emitting points of the two light emitting chips 21a and 21b in the twin light source 21 and the polarization axis (Xa-Xb) of the grating element 22. The inclination may be referred to as a rotating error degree in a radial direction surrounding the optical center axis of the grating element 22. Based on the result of the determined degree of error, the alignment may be adjusted so that the above condition satisfies a tolerable error range. After finishing the adjustment, the locations of the grating element 22 and the light source 21 are fixed. For example, the grating element 22 and the light source 21 may be fixed to a frame, in which components of the optical pickup device are mounted, through a bonding process.

Conventionally, only one light emitting chip in the light source 21 is aligned with the alignment of the location and/or posture of the grating element 22, and the rotating error or the radial error is not corrected as described above.

However, in a structure which includes one grating element, a dispersion in the distance between the light emitting point for DVD and the light emitting point for CD is important. When assembling the twin light source, a tolerance of a distance between the light emitting point for DVD and the light emitting point for CD with respect to a designed value may be greater than an acceptable amount due to an assembling tolerance and a rotation of the light source caused by the component dispersion when assembling the twin light source 21.

Therefore, according to various aspects, when a test mode using both of the laser beam for DVD and the laser beam for CD is performed, the rotation of the light source, that is, the radial error correction, may be performed after identifying the location of the in-line grating element for CD, as well as the grating element for DVD. As a result, the locations of the light emitting points for DVD and CD may be matched to the design values. Therefore, the light emitting points for DVD and CD may be accurately adjusted, and thus, a shift property of the objective lens with respect to the DVD and CD media may be improved.

Figure 6A:
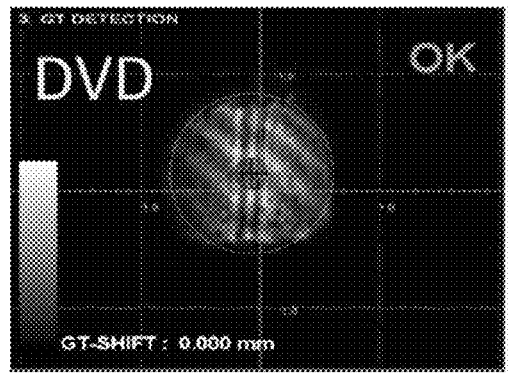
FIGS. 6A-6D are examples of a monitoring screen showing a light emitting point for DVD at a normal location and a light emitting point for CD at an abnormal location, when aligning a light source of an optical pickup device.
Figure 6B:
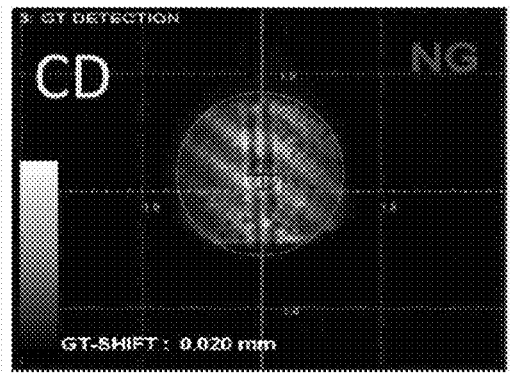
Figure 6C:
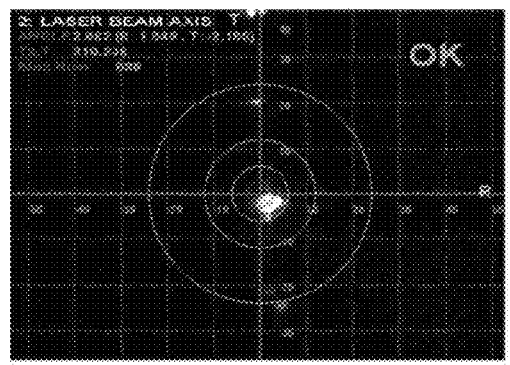
Figure 6D:
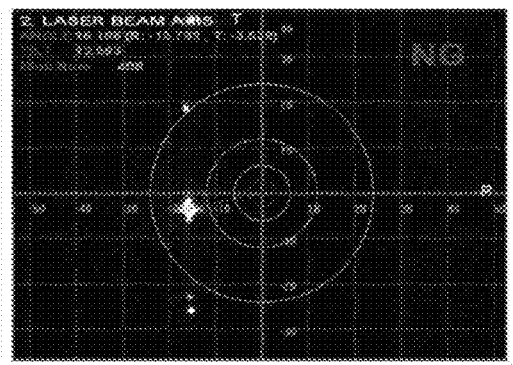

FIGS. 6A-6D illustrate examples of light source alignment. FIG. 6A shows a state in which the light emitting chip for DVD is aligned at a normal position with respect to the grating element, and FIG. 6C shows a landing status of the three-beams for the DVD according to the status of FIG. 6A. FIG. 6B shows a test screen in a state in which the light emitting chip for the CD is dislocated with respect to the polarization axis of the grating element 22, and FIG. 6D shows a landing status of the three-beam for CD in a state of FIG. 6B.

Figure 7:
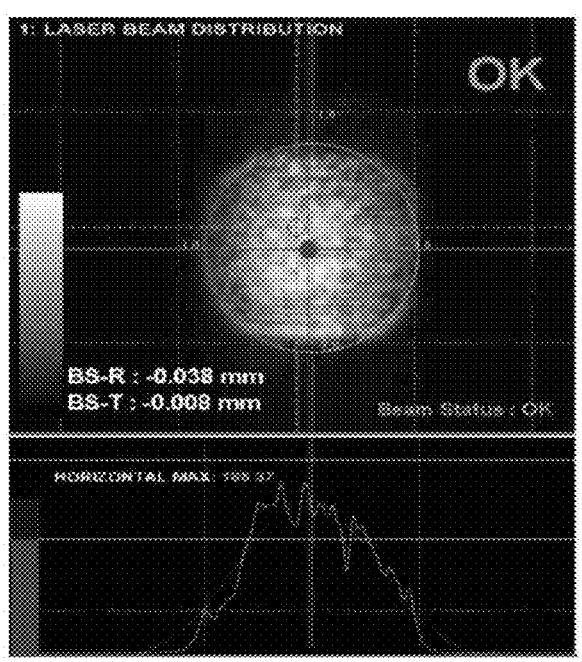
FIG. 7 is an example of a monitoring screen when the light emitting point for DVD and the light emitting point for CD are at normal locations.

That is, FIGS. 6A-6D illustrate an example in which the light emitting chip for DVD is located at a normal position whereas the light emitting chip for CD is out of the normal position due to a radial error. According to various aspects the radial error may be corrected. For example, the laser beam for CD and the laser beam for DVD may be monitored to correct the locations and postures of the light emitting chips for DVD and CD. FIG. 7 illustrates an example of a test screen in which the correction is finished. In FIG. 7, an upper portion shows laser beam distribution, and a lower portion shows variation in the laser beam intensity from a center of a beam cross-section to a peripheral portion.

The correction may be performed during the manufacturing processes of the optical disc drive. The electric current may be supplied to the light source by a circuit unit of the optical disc drive including a laser diode driver (LDD), and the circuit unit may be assembled in the optical disc drive with the light source.

Figure 8:
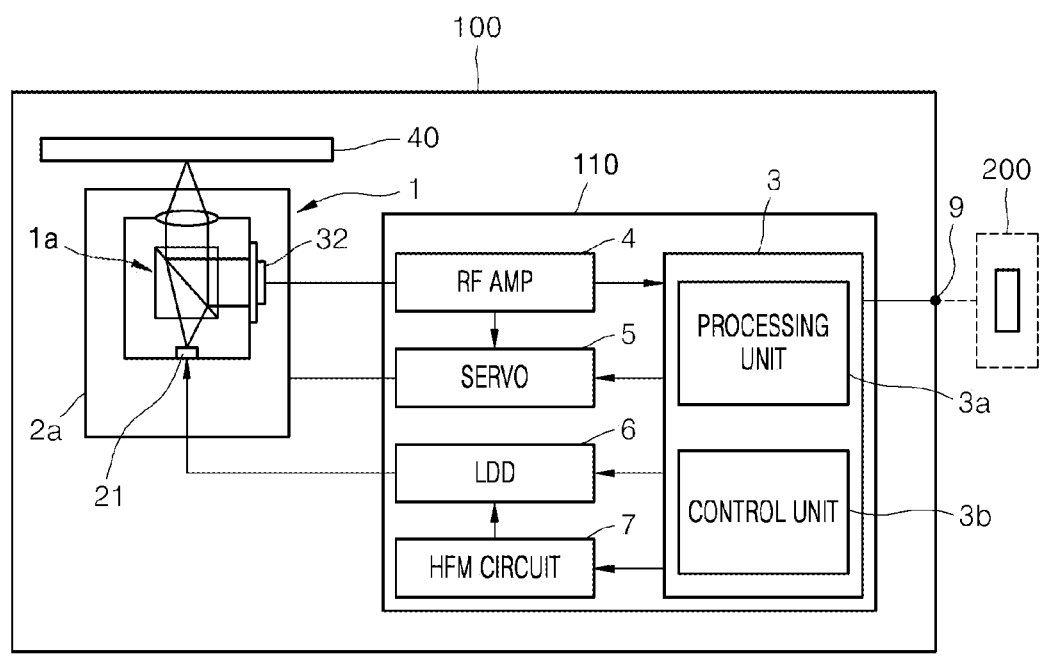
FIG. 8 is a diagram illustrating an example of an optical disc drive.
Figure 9:
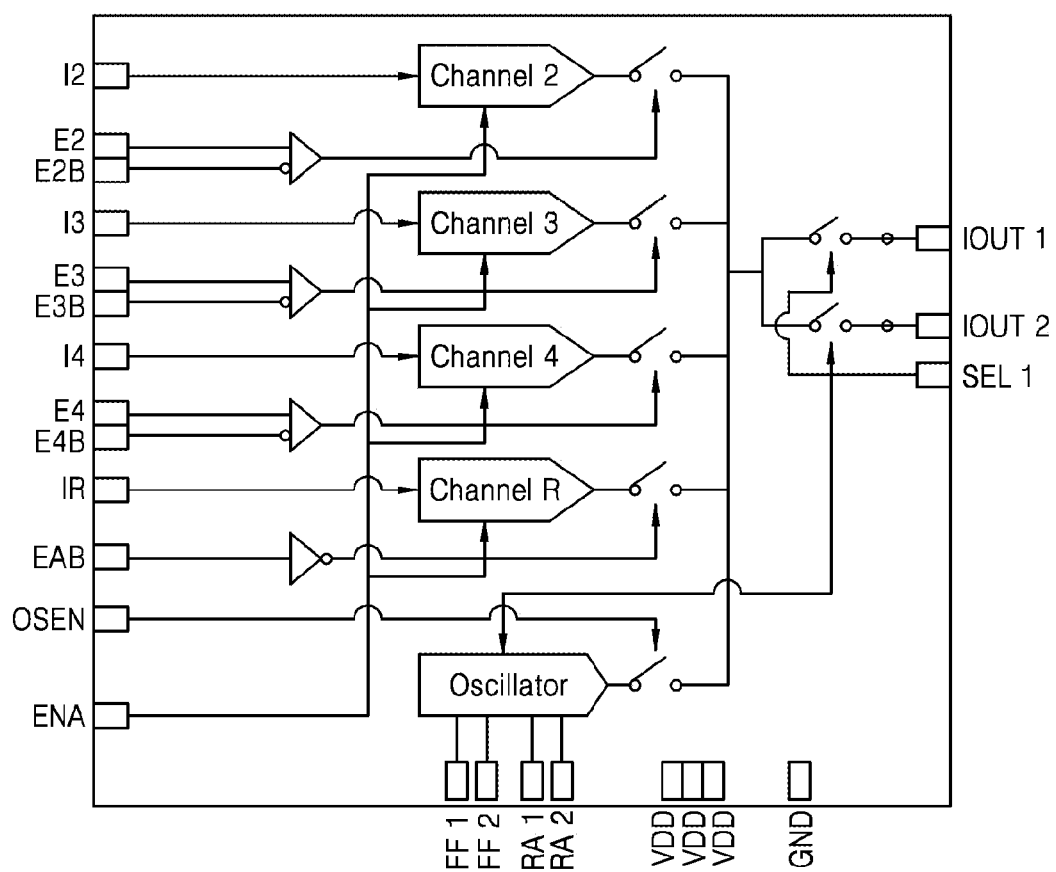
FIG. 9 is an example of an equivalent circuit diagram of laser diode drive (LDD) applied to an optical pickup device and an optical disc drive.

FIG. 8 illustrates an example of an optical disc drive 100, and FIG. 9 illustrates an example of an LDD 6 provided in the circuit unit of the optical disc drive of FIG. 8.

Referring to FIG. 8, the optical disc drive 100 includes an optical pickup device for reading and writing information from and to the optical disc 40, for example, the optical pickup device 1 shown in FIG. 1 and a circuit unit. The optical pickup device 1 includes an optical system that is described above, and a mechanical system 2a mechanically supporting the optical system and triggering a focusing operation and a tracking operation of the objective lens. The light receiving device 32 is electrically connected to a front-end part (IC) 4 including a radio frequency (RF) amplifier provided in the circuit unit, and the light source 21 is connected to a light source driver (or the LDD 6) of the circuit unit. The light source driver 6 is connected to a high frequency modulation (HFM) circuit 7 providing an HFM component. The mechanical system 2a of the optical pickup device 1 is connected to a servo unit 5. The servo unit 5 controls the tracking and the focusing operations of the optical pickup device 1. The front-end part 4, the servo unit 5, the light source driver 6, and the HFM circuit 7 are connected to a digital signal processor (DSP) 3. In this example, the DSP 3 includes an information processing unit 3a including a decoder/encoder for processing signals from the front-end part 4, and a system control unit 3b controlling all the elements in the system such as the servo unit 4, the light source driver 6, and the HFM circuit 7.

In the optical disc driver 100 having the above structure, the LDD 6 is used in the alignment and adjustment of the light source. The LDD 6 may simultaneously supply electric current to the light emitting chips 21a and 21b in the light source 21 during the aligning processes or the test processes, and thus, the laser beams may be output from the two light emitting chips during the test process to perform the above described alignment processes.

FIG. 9 illustrates an example of the LDD 6 provided in the circuit unit of the optical disc drive. As shown in FIG. 9, internal structures of the LDD 6 are the same as the conventional structure, except that switches for selecting current output ports are connected to the current output ports IOUT1 and IOUT2, and a switch select port SEL1 is formed to selectively or simultaneously operate the current output ports IOUT1 and IOUT2. Signals of three voltage stages (HIGH, MIDDLE, LOW), that is, a first voltage, a second voltage, and a third voltage, are applied to the switch select portion SEL1, unlike the conventional two stages (HIGH and LOW). As an example, when the applied voltage is the second voltage, that is, the middle level (MIDDLE), a logic determination circuit may recognize this as a test mode, and the current may be commonly output from the two current output ports IOUT1 and IOUT2 so that the two light emitting chips in the light source 21 are driven. As another example, if the applied voltage is a high signal, that is, the first voltage, the first output port IOUT1 may be selected, and if the applied voltage is a low signal, that is, the third voltage, the second output port IOUT2 may be selected so as to be compatible with the conventional circuits.

The embodiments of the present invention may be applied to an optical disc drive for CD/DVD/blu-ray (BD) supporting the BD, as well as the CD and DVD. In such an optical disc drive, the BD may use a single light source and may not need to perform the above described method, and the alignment processes may be applied only to the CD/DVD optical system.

According to various aspects, the optical system may be precisely adjusted so as to improve characteristics of the DVD and the CD, and accordingly, reproducing and dynamic characteristics of an optical pickup unit (OPU) may be improved.

When one in-line grating element is applied to the optical pickup device, a dispersion of the distance between the light emitting point for DVD and the light emitting point for CD is important. When assembling the twin laser diode (LD), a tolerance of the distance between the light emitting point for DVD and the light emitting point for CD may be greater than a predetermined value as a result of the rotation of the LD caused by the assembling tolerance and the component distribution. Therefore, while in a test mode in which light sources for DVD and CD are both turned on and are applied to the LDD, the LD rotation may be adjusted by identifying the location of the in-line grating element for the CD, as well as the in-line grating element for DVD. Thus, the locations of the light emitting points for DVD and CD may be adjusted similarly to the design conditions. Therefore, the light emitting points for DVD and CD may be adjusted precisely, and a shift characteristic, that is, a dynamic characteristic of the objective lenses of the DVD media and the CD media may be improved.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of aligning a twin-light source and a grating element in an optical pickup device, the method comprising:
    generating two laser beams from two light emitting chips of the twin-light source by supplying an electric current to the two light emitting chips;
    aligning the twin-light source with respect to the grating element while simultaneously monitoring a diffraction status of the two laser beams as they are transmitted through the grating element using an imaging device; and
    fixing the grating element and the light source to a base of the optical pickup device, in response to the aligning.

2. The method of claim 1, wherein the generating comprises forming, by a collimating lens, the two laser beams as parallel light, and during the aligning the imaging device captures the two laser beams transmitted through the collimating lens.

3. The method of claim 1, wherein the twin-light source comprises a twin light source for a compact disc (CD) and a digital versatile disc (DVD).

4. The method of claim 1, wherein the twin-light source is driven by an electric current supplied from a laser diode driver (LDD).

5. The method of claim 1, wherein the aligning comprises adjusting location errors and rotation errors of the two light emitting chips with respect to an optical center axis of the grating element.

6. The method of claim 1, wherein the aligning comprises matching the optical center axis to one light emitting point of the two light emitting chips, and aligning an extension line connecting light emitting points of the two light emitting chips with respect to a direction of a polarization axis of the grating element.

7. The method of claim 1, further comprising coupling the twin-light source and the grating element to the base of the optical pickup device, prior to performing the generating.

8. An optical disc drive, comprising:
    an optical pickup device comprising a twin-light source that has two light emitting chips for generating two laser beams, and a grating element for diffracting the two laser beams as they pass through; and
    a laser diode drive (LDD) comprising a signal processing unit for processing electric signals emitted from the optical pickup device, and a plurality of output ports for supplying electric currents to the two light emitting chips to control an output of the twin-light source during a simultaneous alignment operation of the two light emitting chips and the grating element.

9. The optical disc drive of claim 8, wherein the twin-light source comprises a twin light source for a compact disc (CD) and a digital versatile disc (DVD).

10. The optical disc drive of claim 9, wherein the plurality of output ports comprise two output ports for supplying the electric current to the twin-light source for CD and DVD, and the two output ports output an electric current during the alignment operation for correcting a location and a posture of the twin-light source with respect to the grating element.

11. The optical disc drive of claim 8, wherein the LDD further comprises a select port which receives a signal from the LDD and which is configured to select one or more of two output ports to which a signal is to be supplied to determine which of the two light emitting chips is to be driven.

12. The optical disc drive of claim 11, wherein the signal applied to the select port comprises one of a first voltage, a second voltage, and a third voltage which are different voltage levels from each other, and
    in response to a signal of the first voltage or the third voltage being applied, only one of two output ports is selected, and in response to a signal of the second voltage being applied, both of the two output ports are selected.

13. A method of aligning a twin-light source in an optical disc drive, the method comprising:
    generating two laser beams from two light emitting chips in a twin-light source of an optical pickup of the optical disc drive by supplying an electric current to the two light emitting chips of the twin-light source using a laser diode drive (LDD) provided in the optical disc drive;
    transmitting the two laser beams through a grating element provided in the optical pickup device; and
    simultaneously aligning the two light emitting chips of the twin-light source with respect to the grating element while monitoring diffraction states of the two laser beams transmitted through the grating element.

14. The method of claim 13, wherein the twin-light source comprises a light source for a CD and a DVD.

15. The method of claim 13, wherein the LDD comprises two output ports for supplying an electric current to the twin-light source and a select port which receives a signal from the LDD and which is configured to select one or more of the two output ports to determine which of the two light emitting chips is to be driven, and the two output ports output the electric current in a process of correcting a location and a posture of the twin-light source with respect to the grating element.

16. The method of claim 15, wherein the signal applied to the select port comprises one of a first voltage, a second voltage, and a third voltage that are different voltage levels from each other, and
    in response to a signal of the first voltage or the third voltage being applied, only one of the two output ports is selected, and in response to a signal of the second voltage being applied, both of the two output ports are selected.

* * * * *